(12) United States Patent
Döhler et al.

(10) Patent No.: US 6,211,322 B1
(45) Date of Patent: Apr. 3, 2001

(54) (METH)ACRYLATE ESTERS OF ORGANOSILOXANE POLYOLS, PROCESS FOR THEIR PREPARATION, AND THEIR USE AS RADIATION-CURABLE MATERIALS

(75) Inventors: Hardi Döhler, Hattingen; Thomas Ebbrecht, Witten; Stefan Stadmüller, Essen, all of (DE)

(73) Assignee: Th. Goldschmidt AG, Essen (DE)

( * ) Notice: Subject to any disclaimer, the term of this patent is extended or adjusted under 35 U.S.C. 154(b) by 0 days.

(21) Appl. No.: 09/260,180

(22) Filed: Mar. 1, 1999

(30) Foreign Application Priority Data

Mar. 3, 1998 (DE) ............................................. 198 08 786

(51) Int. Cl.$^7$ .................................................... C08G 77/04
(52) U.S. Cl. ................................ 528/15; 528/25; 528/26; 528/29; 528/31; 528/33; 524/860; 524/861; 524/862; 523/100; 522/60; 522/99; 522/148; 525/474; 525/479
(58) Field of Search ................................ 528/15, 25, 26, 528/29, 31, 33; 524/860, 861, 862; 523/300; 522/60, 99, 148; 525/474, 479

(56) References Cited

U.S. PATENT DOCUMENTS

| | | | | |
|---|---|---|---|---|
| 4,640,940 | * | 2/1987 | Jacobine et al. | 522/99 |
| 4,963,438 | * | 10/1990 | Weitemeyer et al. | 428/447 |
| 5,552,506 | * | 9/1996 | Ebbrecht et al. | 528/15 |
| 5,733,971 | * | 3/1998 | Feldmann-Krane et al. | 524/837 |

FOREIGN PATENT DOCUMENTS

| | | |
|---|---|---|
| 27 47233 C3 | 7/1978 | (DE) . |
| 29 48708 C2 | 8/1980 | (DE) . |
| 38 10140 C1 | 10/1989 | (DE) . |
| 38 20294 C1 | 10/1989 | (DE) . |

* cited by examiner

Primary Examiner—Robert Dawson
Assistant Examiner—Jeffrey B. Robertson
(74) Attorney, Agent, or Firm—Frommer Lawrence & Haug LLP

(57) ABSTRACT

The invention relates to organopolysiloxanes comprising (meth)acrylate groups, to a process for their preparation and to their use as radiation-curing coating materials.

29 Claims, No Drawings

(METH)ACRYLATE ESTERS OF ORGANOSILOXANE POLYOLS, PROCESS FOR THEIR PREPARATION, AND THEIR USE AS RADIATION-CURABLE MATERIALS

RELATED APPLICATIONS

This application claims priority to German application No. 198 08 786.1, filed Mar. 3, 1998, herein incorporated by reference.

BACKGROUND OF THE INVENTION

1. Field of the Invention

The invention relates to novel organosilicon compounds comprising terminally and/or laterally at least one Si—C-bonded organic radical which has at least two (meth)acrylate groups attached by way of primary hydroxyl groups and may or may not have monocarboxylic acid groups, free from double bonds, that are capable of undergoing addition polymerization.

The invention additionally relates to a process for preparing these organomodified polysiloxanes and to their use as curable coating compositions having abhesive properties.

2. Description of the Related Art

The attachment of the radicals containing acrylate groups to the framework of the organosiloxane is primarily by way of Si—C bonds, avoiding Si—O—C linkages. Polysiloxanes which comprise acrylic ester groups (acrylate groups) have established and used as binders that can be cured with high-energy radiation and used, for example, as binders, for printing inks and for the preparation of film-forming binders, or for coating compositions for plastic, paper, wood and metal surfaces. Curing is effected, in particular, by means of UV radiation (following the addition of known photoinitiators, such as benzophenone and its derivatives) or by means of electron beams.

The preparation of organosiloxanes having acrylate-modified organic groups which are attached to the siloxane unit by way of Si—O and/or Si—C bonds is described in numerous patents. The following unexamined and granted patent documents are given as representatives of the prior art.

In accordance with a process of DE-C-27 47 233, organopolysiloxanes in which the acrylate-containing organic groups are connected to the polysiloxane framework by way of an Si—O—C bond can, by reacting —COH-containing (meth)acrylic esters with organo-polysiloxanes which have SiX groups (X=alkoxy, hydroxy or chloro), be prepared by using as organopolysiloxanes those of the formula

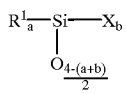

$R^1$=alkyl group of 1 to 4 carbon atoms and/or a phenyl group,

X=chloro or an $OR^2$ group, $R^2$=alkyl group of 1 to 4 carbon atoms and/or hydrogen, A=from 1.0 to 2.0, b=0.02 to 1.6, a+b≦2.66, where the siloxane molecule has from 3 to 100 Si atoms, and using as (meth)acrylic esters pentaerythritol tri(meth)acrylate and employing, based on COH and SiX groups, from 0.05 mol to equimolar amounts of the pentaerythritol ester.

In a modification of this process, following a procedure in accordance with DE-C-29 48 708, organopolysiloxanes of the formula

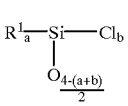

($R^1$=alkyl of 1 to 4 carbon atoms, vinyl and/or phenyl, with the proviso that at least 90 mol % of the groups $R^1$ are methyl, a=from 1.8 to 2.2, b=from 0.004 to 0.5) are first reacted with—based on SiCl groups—at least 2-molar amounts of a dialkylamine whose alkyl groups each have 3 to 5 carbon atoms, and where the carbon atoms adjacent to the nitrogen each carry not more than one hydrogen atom. The reaction product is then reacted with at least equimolar amounts of pentaerythritol triacrylate or pentaerythritol trimethacrylate and the product of the process is subsequently separated in a manner known per se from solid constituents suspended in it.

The skilled worker is aware that the acrylate-modified organopolysiloxanes, where the organic groups bearing the acrylate radical(s) are attached to the siloxane framework by way of Si—C bonds, are superior in terms of stability to hydrolysis to those compounds where linkage is via an Si—O—C bond.

Organopolysiloxanes where the organic groups containing acrylic ester are connected to the polysiloxane framework by way of Si—C bonds can be prepared, for example, by subjecting a hydrosiloxane to addition reaction with allyl glycidyl ether or another suitable epoxide having an olefinic double bond and, following the addition reaction, esterifying the epoxide with acrylic acid, with opening of the epoxide ring. This procedure is described in DE-C-38 20 294.

A further option for the preparation of acrylate-modified polysiloxanes with Si—C linkage of the modifying group(s) is to subject a hydrosiloxane to addition reaction with an alcohol having an olefinic double bond, such as allyl alcohol, in the presence of a platinum catalyst and then to react the OH group of this alcohol with acrylic acid or with a mixture of acrylic acid and other saturated or unsaturated acids. This procedure is described, for example, in DE-C-38 10 140.

Using the procedures described above, however, it is only possible to attach, in each case one, single (meth)acrylate group per connecting link to the siloxane framework. In order to achieve maximum crosslinking, i.e., a maximum number of reactive groups, in conjunction with as low as possible a modification density on the siloxane framework, it would be desirable to be able to attach more than one (meth)acrylate group per bridging link.

Furthermore, such compounds make it possible, through partial substitution of (meth)acrylic ester groups by monocarboxylic ester groups that are free of double bonds capable of undergoing addition polymerization, to exert a controlled influence on the crosslinking density of the coating without running the risk of falling below the minimum concentration of crosslinkable reactive groups that is required for crosslinking. In this way, starting from the same intermediate, it is possible to tailor the glass transition temperature, chemical and physical resistance, and abhesiveness of the coating to the particular application requirements. In addition, the dynamic peeling characteristics of a pressure-sensitive adhesive from an abhesive coating is directly dependent on the crosslinking density and/or the glass transition temperature. While a hard, highly crosslinked abhesive coating frequently results in a loud rattling sound on peel removal, which results from oscillating fluctuations in the release force (known as the "slip stick effect"), peel removal from a soft, flexible surface proceeds much more evenly and thus more quietly.

Such compounds should be obtainable by the hydrosilylation of Si—H-functional polysiloxanes to organic compounds having at least three or more, primary hydroxyl groups, one of which is etherified with an organic radical that includes a double bond which is amenable to the hydrosilylation, and subsequent esterification of the free OH groups with (meth)acrylic acid or with mixtures of (meth)acrylic acid and monocarboxylic acids which include no double bonds amenable to crosslinking.

U.S. Pat. No. 4,640,940 describes a process for preparing polyorganosiloxanes of the general formula

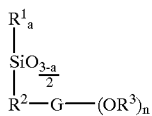

where $R^1$ is an organic radical, $R^2$ is an alkyl or alkenyl group; G is an n+1 valent hydrocarbon, oxo hydrocarbon or polyoxo hydrocarbon radical, in which some or all of the hydrogen atoms may have been replaced by halogen atoms; $R^3$ is H or an organofunctional group, especially an addition-polymerizable organofunctional group or a group which initiates or accelerates addition polymerization, n is $\geq 2$, with the proviso that if n=2 and one of the radicals $R^3$=H the other radical $R^3$ is likewise H; and a=0, 1 or 2.

In order to suppress the formation of Si—O—C-linked byproducts, when preparing such compounds patentees indicate that it is necessary to convert the corresponding alcohols to a ketal, prior to the hydrosilylation in the presence of hexachloroplatinic acid, and to remove the protective group again after the addition reaction and prior to the esterification. This implies additional reaction steps together with associated additional energy costs and with byproducts requiring disposal.

Another example of that U.S. Patent describes the reversal of the reaction sequence, i.e., first the alcohol being esterified with methacrylic acid and then the addition reaction with the hydrosiloxane taking place.

On reworking these procedures, however, it was found that the reactions proceed in a manner different to that described. Whereas an addition onto the olefinic double bond would result exclusively in Si—C linkages, spectroscopic analyses, inter alia, revealed that under the process conditions specified in the first case a considerable proportion of Si—O-linkage (up to 50%) had been formed, with opening of the acetal unit. The hydrosilylation reaction with trimethylolpropane monoallyl ether dimethacrylate also brought a high proportion of Si—O—C-linked adducts and also adducts, obtained via the hydrosilylation of the (meth)acrylate double bond, which, as a result of which the latter, no longer have a double bond available for the subsequent radiation crosslinking.

Although, products of this kind, can still be cured by radiation, these products, nevertheless, exhibit inadequate curing and a sharp decrease in the release effect on storage. Products of this kind are therefore unsuitable for use as an abhesive coating material.

OBJECT OF THE INVENTION

Surprisingly, it has been found that, in the hydrosilylation of the polyhydroxy compounds described, the formation of Si—O—C-linked byproducts can be effectively suppressed if the catalyst employed comprises complex compounds with rhodium or platinum as the central atom. In this context, catalytic compounds which have been found in particular to suppress by product formation are platinum and rhodium catalysts with the oxidation states I, II and III. In particular, particularly preferred catalytic compounds are tris(ethylenediamine)-rhodium(III), bis(triphenylphosphine) rhodium carbonyl chloride; 2,4-[Rh($C_5H_7O_2$)(CO)(PPh$_3$)]; 2,4-pentane-dionatodicarbonyl-rhodium(I); tris(2,4-pentanedionato)-rhodium(III); acetylacetonatobis(ethylene) rhodium(I); di-$\mu$-chlorodichlorobis(cyclohexene)diplatinum (II); di-$\mu$-chlorodichlorobis(ethylene)diplatinum(II); 1,1-cyclobutanedicarboxylatodiamineplatinum(II); dibromo(1, 5-cyclooctadiene)platinum(II); cis-dichlorobis(pyridine)-platinum(II); dichlorobis(1,5-cyclooctadiene)-platinum(II); dichloro(dicyclopentadienyl)platinum(II).

SUMMARY OF THE INVENTION

The present invention therefore provides organosiloxanyl (meth)acrylates which are essentially free, e.g. not more than 10%, from Si—O—C-linked byproducts.

The substances of the invention are obtainable by addition reaction of organopolysiloxanes of the general formula I

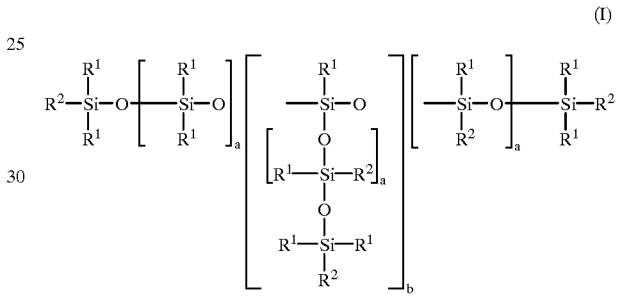

$R^1$=identical or different, aliphatic or aromatic hydrocarbon radicals, $R^2$=$R^1$ or H, with the proviso that at least one radical $R^2$ is H, a=from 0 to 500, b=from 0 to 5, with polyhydroxy alkenyl ethers of the general formula II

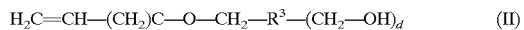

$$H_2C=CH-(CH_2)_c-O-CH_2-R^3-(CH_2-OH)_d \quad (II)$$

$R^3$=a linear, cyclic, aromatic or branched hydrocarbon radical (with or without ether bridges), c=from 0 to 10, d=from 2 to 10, in the presence of platinum or rhodium catalysts and subsequent reaction with—based on hydroxyl groups—from about 0.4- to about 1-molar amounts of (meth)acrylic acid and from about 0- to about 0.6-molar amounts of a monocarboxylic acid, which is free from double bonds that are capable of undergoing addition polymerization, said subsequent reaction taking place under customary esterification conditions. The structure of the hydroxy-functional organopolysiloxanes, as defined by the indices a and b, is retained even after the reaction with (meth)acrylic acid and other monocarboxylic acids.

Within the polymeric molecule, $R^1$ can be identical or different and preferably have 1 to 10 carbon atoms. Preferably $R^1$ can be a lower alkyl radical of 1 to 10 carbon atoms or an aromatic hydrocarbon radical of 6 to 10 carbon atoms, with a phenyl radical being especially preferred as an aromatic radical. The alkyl radicals can be present in straight-chain or branched form. Preferably, at least 90% of the radicals R¹ are methyl radicals. Preferred R³ radicals are those which are linear, cyclic or branched hydrocarbon radicals of 1 to 20 carbon atoms or an aromatic radical of 6 to 20 carbon atoms, with phenyl being especially preferred as an aromatic radical. Examples of the radical R³ are alkyl radicals of 1 to 20 carbon atoms, preferably 1 to 10 and, with particular preference, 3 to 8 carbon atoms. The index c is preferably from 0 to 5, d is preferably from 2 to 6. With particular preference, c=1 and d=from 2 to 5.

Particularly preferred catalysts for the hydrosilylation of the polyhydroxy alkenyl ethers of the general formula II within the hydrosiloxane starting compounds of the general formula I are platinum and rhodium catalysts of oxidation states I, II and III. Compounds which have been found to be particularly preferred among the catalysts with rhodium as central atom are tris(ethylenediamine)rhodium(III), bis (triphenylphosphine)rhodium carbonyl chloride; 2,4-[Rh(C₅H₇O₂)(CO)(PPh₃)]; 2,4-pentanedionatodicarbonylrhodium(I); tris(2,4-pentanedionato)rhodium(III); and acetylacetonatobis (ethylene)rhodium(I). Compounds which have been found to be particularly preferred among catalyst systems with platinum as central atom are: di-μ-chloro-dichlorobis (cyclohexene)diplatinum(II); di-μ-chloro-chlorobis (ethylene)diplatinum(II); 1,1-cyclo-butanedicarboxylatodiamineplatinum(II); dibromo(1,5-cyclooctadiene)platinum(II); cis-dichlorobis(pyridine)-platinum(II); dichlorobis(1,5-cyclooctadiene)-plati-num(II); dichloro(dicyclopentadienyl)platinum(II).

Advantages of the process of the invention and, respectively, of the (meth)acrylate-functional organopolysiloxanes of the invention are, accordingly:

1. The formation of Si—O—C-linked byproducts is effectively suppressed, and the resulting products possess excellent stability on storage.
2. No additional reaction steps are required for the introduction and removal of protective groups.
3. For each bridging link that is linked to the siloxane framework by way of an Si—C bond it is possible to attach more than one (meth)acrylate unit which is amenable to crosslinking, thereby providing increased reactivity with a minimal modification density.
4. Through the choice of the mixture of (meth)acrylic acid and monocarboxylic acids containing no double bonds amenable to crosslinking that is employed in the esterification it is possible to establish specific performance properties, such as crosslinking density, glass transition temperature, and coating hardness, in the end product without running the risk of falling below the minimum concentration of crosslinkable reactive groups that is required for crosslinking.
5. The curing of the products of the substrate material is possible at high speed; there is little or no change in the abhesiveness of the cured products in the course of storage as discernible through a rise in the release forces.

Examples of suitable polyhydroxy alkenyl ethers of the formula II according to the invention, which have both at least one hydrosilylatable double bond and at least two esterifiable primary hydroxyl groups, are:

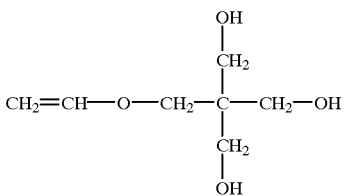

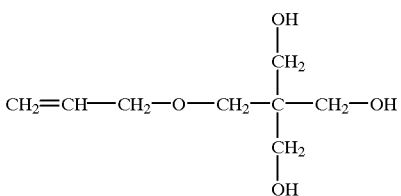

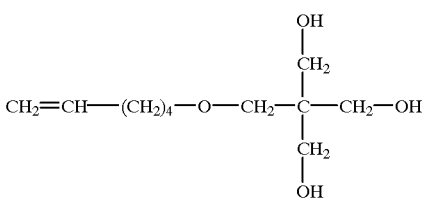

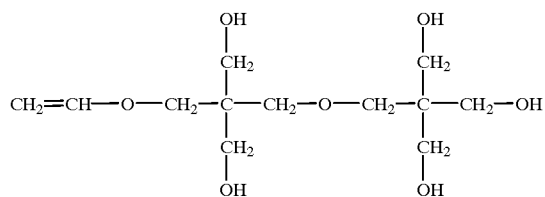

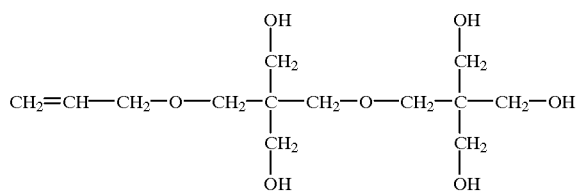

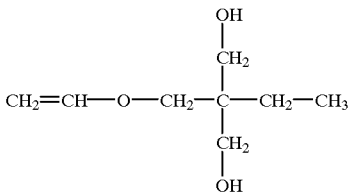

-continued

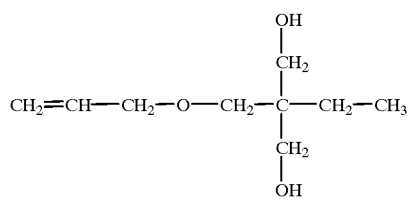

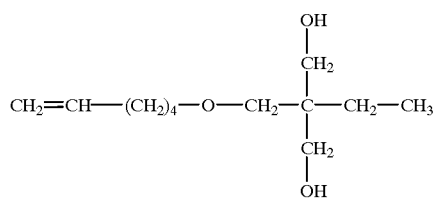

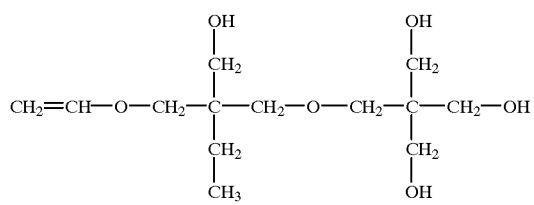

-continued

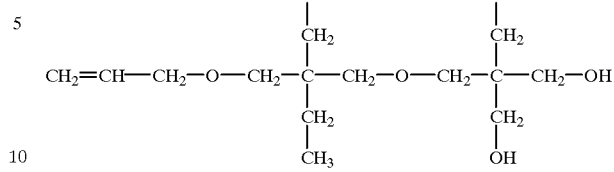

Following the esterification reaction with (meth)acrylic acid or with a mixture of (meth)acrylic acid and carboxylic acids, in accordance with the prior art, with azeotropic removal of the stoichiometric amount of water that is formed, the siloxane framework can be equilibrated to correspondingly higher siloxane chain lengths in the presence of an acidic catalyst. The preparation of such compounds and their use as curable coating compositions having abhesive properties are likewise provided by the invention.

The person skilled in the art is well aware that the compounds are present in the form of a mixture whose distribution is governed essentially by laws of statistics. The values of the indices a and b are therefore average values.

Preferred inventive compounds have the general formula

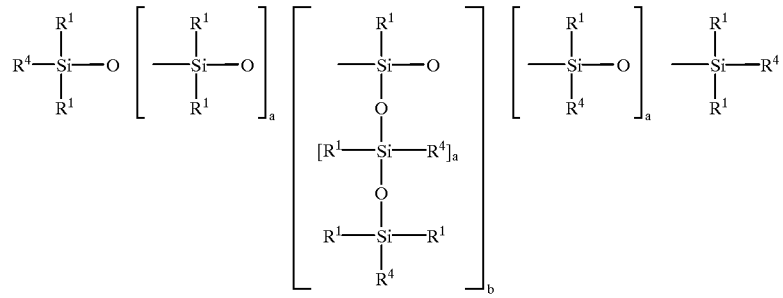

(II)

$R^1$=identical or different, aliphatic or aromatic hydrocarbon radicals of 1 to 10 carbon atoms,
a=0 to 500,
b=0 to 5,
$R^4 = R^1$ or the radical $(CH_2)_2-(CH_2)_c-O-CH_2-R^3$ $(CH_2-OR^5)_d$, with the proviso, that at least one radical $R^4$ is not $R^1$,
$R^3$=linear, cyclic, aromatic or branched hydrocarbon radicals of 1 to 20 carbon atoms optionally comprising an ether linkage,
c=0 to 10,
d=2 to 10,

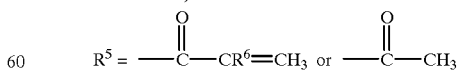

$R^6$=H or $CH_3$
Examples of substances of the invention are:

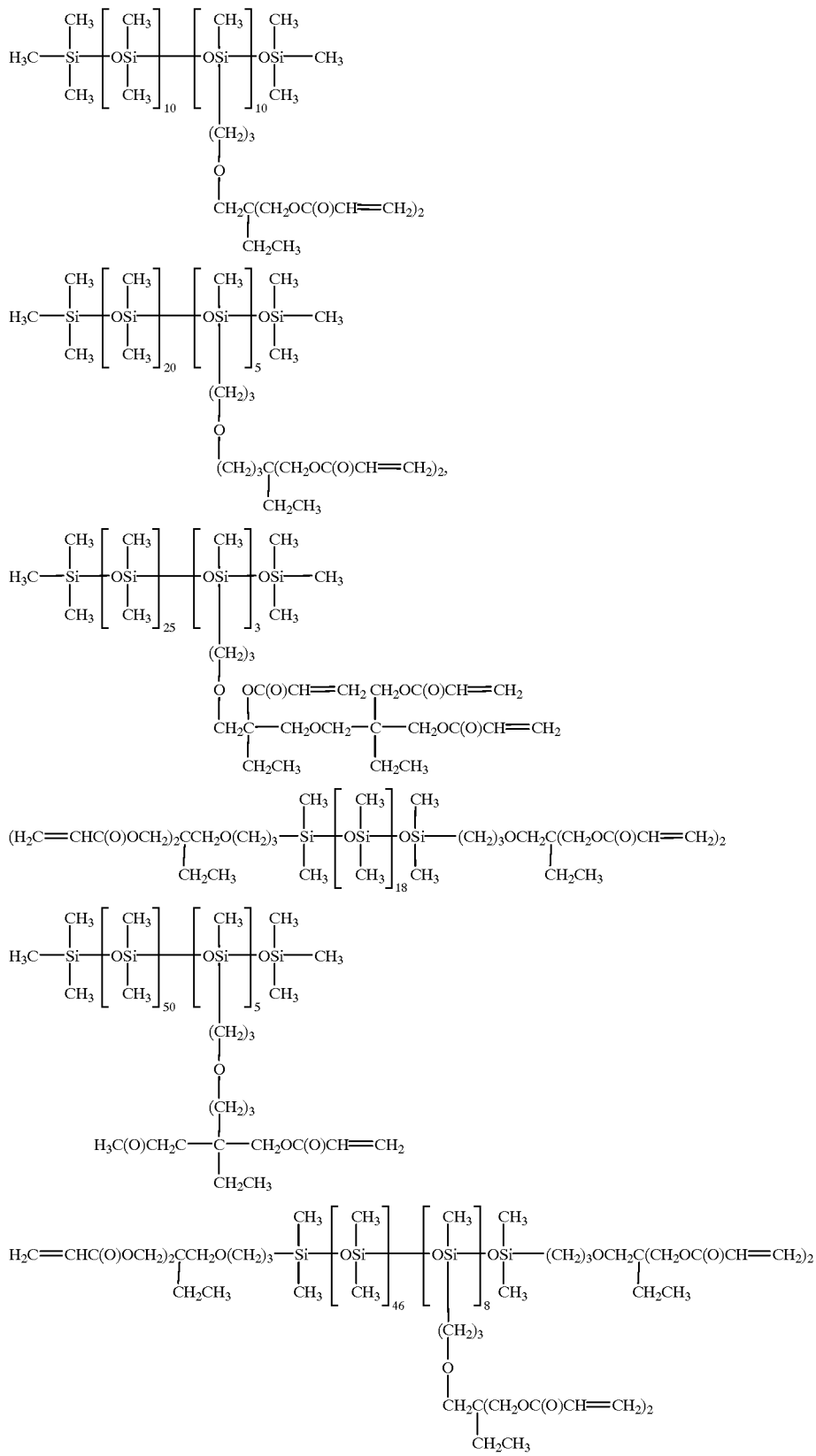

The compounds of the invention can be employed as radiation-curing coating materials or as additives in such systems. They can be compounded in a customary manner with curing initiators, fillers, pigments, other, conventional acrylate systems, and further customary additives. The compounds of the invention can be crosslinked three-dimensionally by means of free radicals, and cure thermally with the addition, for example, of peroxides or under the influence of high-energy radiation, such as UV or electron beams, within a very short period to form mechanically and chemically resistant films which, given an appropriate composition of the compounds of the invention, exhibit predeterminable abhesive properties. If the radiation source used is UV light, crosslinking takes place preferably in the presence of photoinitiators and/or photosensitizers, such as benzophenone and its derivatives, or benzoin and corresponding substituted benzoin derivatives.

In the compositions comprising the organopolysiloxanes of the invention, photoinitiators and/or photo-sensitizers are used preferably in amounts from 0.01 to 10% by weight, in particular from 0.1 to 5% by weight, based in each case on the weight of the acrylate-functional organopolysiloxanes.

EXAMPLES

The examples which follow are intended to illustrate the invention, but constitute no restriction whatsoever.

Example 1 a) Addition Reaction of 1,1,1-tris(hydroxy-methyl)propane Monoallyl Ether with a Siloxane Having Lateral Si—H Functional Groups In a 1 l four-necked flask equipped with intensive condenser, thermometer and dropping funnel, 452 g (+30% excess) of 1,1,1-tris(hydroxymethyl)propane monoallyl ether together with 10 ppm of diaminocyclobutanedicarboxylicplatinum as catalyst were heated to 100° C. in an inert atmosphere. When the temperature had been reached, 672 g of terminally Si—H-functionalized polydimethylsiloxane of average chain length N=10 and of the general formula HMe$_2$SiO(SiMe$_2$O)$_8$SiMe$_2$H were added dropwise over the course of 30 minutes. After the end of the addition the reaction mixture is stirred at 100° C. until, after about 3 h, a conversion of >99.5% was obtained. Filtration to remove residues of catalyst and removal of the volatile reaction byproducts by distillation at 150° C./0.1 bar gave an oil of low viscosity, about 350 mPas, which according to $^1$H- and $^{29}$Si—NMR spectra had the general formula:

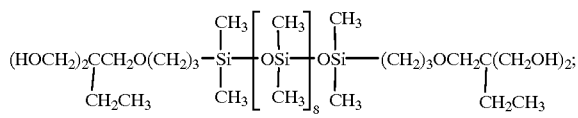

b) Acrylicization of the Bishydroxyalkylsiloxane

In a 1 l four-necked flask with stirrer, dropping funnel and thermometer, 325 g of the bishydroxyalkylsiloxane described under 1a) together with 230 ml of cyclohexane and 0.35 g of hydroxyanisole were heated to 65° C. At this temperature, 0.5% of trifluoromethanesulfonic acid were added and then a total of 135 g of acrylic acid (20% excess) were added dropwise. The water of condensation was separated off using a water separator. The reaction period was about 3 hours. Subsequently, the reaction mixture have neutralized with 2% strength sodium carbonate solution, filtered and distilled.

According to the results of $^{29}$Si—NMR and $^{13}$C—NMR spectroscopy the end product had the following structure:

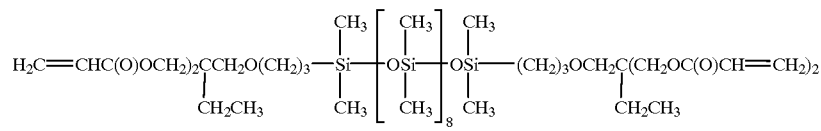

Example 2

In the manner described in Example 1, 238 g of a laterally Si—H-functionalized polydimethylsiloxane of average chain length N=10 and of the general formula Me$_3$SiO(SiMe$_2$O)$_5$(SiHMe$_2$)$_3$SiMe$_3$ were reacted with 226 g of 1,1,1-tris(hydroxymethyl)propane monoallyl ether using 10 ppm of cis-dichlorobis(pyridine)platinum and 23 g of n-butanol. After 5 hours of stirring at 100° C. the conversion was >99.5%.

In order to esterify the hydroxyalkylsiloxane with acrylic acid, in the same way as described in Example 1b), 220 g of the terminal hydroxyalkylsiloxane are reacted with 53 g of acrylic acid (20% excess) in 140 ml of cyclohexane with the addition of 100 ppm of methylhydroquinone and 0.5% of trifluoromethanesulfonic acid. The reaction product was worked up by neutralization with 2% strength sodium carbonate solution, filtration and distillation.

According to the results of $^{29}$Si—NMR and $^{13}$C—NMR spectroscopy the end product has the following structure:

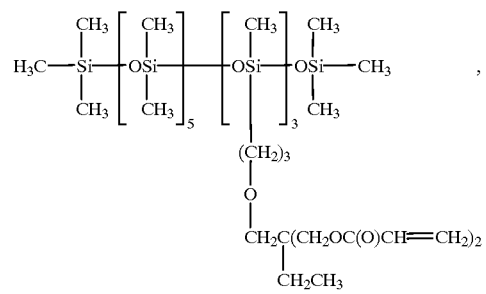

Example 3

Equilibration of Polysiloxanes Containing Acrylic Ester Groups to Higher Chain Lengths.

150 g of the compound described in Example 1b) were reacted at 60° C. for 10 hours together with 802 g of a mixture of octamethylcyclotetrasiloxane and decamethylcyclopentasiloxane and with 0.7 g of trifluoro-methanesulfonic acid. Then 14 g of sodium hydrogen carbonate were added and the mixture was stirred at an ambient temperature of 60° C. for 2 hours. Filtration and removal of the volatile reaction products at 120° C./0.1 mbar give a liquid of low viscosity.

According to the results of $^{29}$Si—NMR and $^{13}$C—NMR spectroscopy the end product had the following structure:

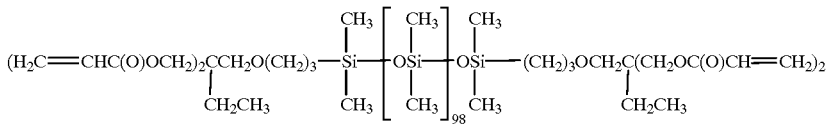

Example 4

The procedure of Example 1a) was repeated with the modification that, instead of 1,1,1-tris-(hydroxymethyl) propane monoallyl ether, 4-ethyl-4(allyloxymethyl)-2,2-dimethyl-1,3-dioxane is employed and the use of n-butanol as cocatalyst was omitted. The hexachloroplatinic acid was added as a 2% strength solution to the ethyl acetate.

Spectroscopic evaluation of the reaction product following workup, by means of $^{13}$C—NMR and $^{29}$Si—NMR, indicated a content of Si—O—C-linked reaction products of 90% and a content of Si—C-linked reaction products of less than 10%.

Example 5

The procedure of 1b) is modified to the effect that in order to esterify 200 g of the bishydroxysiloxane described under 2 a mixture of 116 g of acrylic acid and 25 g of acetic acid was used. After a reaction period of four hours and workup as described above, a product was obtained which from evaluation of the spectroscopic data could be assigned the following structure:

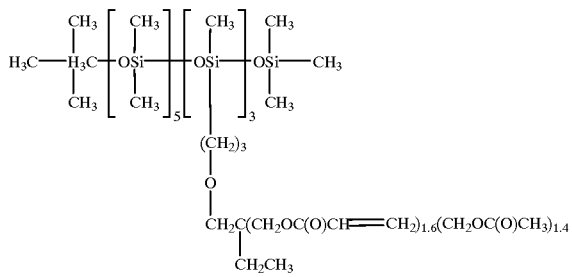

Performance Testing

In order to examine the performance properties of the substances to be used in accordance with the invention, the products of the inventive Examples and those of the noninventive, Comparative Examples were applied to flat substrates (oriented polypropylene film) and, following an addition of 2% of photoinitiator (Darocur® 1173, Ciba Geigy), are cured by exposure to UV light at 120 W/cm with a belt speed of 20 m/min. The amount applied is in each case about 1 g/m².

Release Force

The release forces were determined using different, 25 mm wide adhesive tape from Beiersdorf, namely an adhesive tape coated with acrylate adhesive and obtainable commercially under the designation TESA® 7475 and adhesive tapes coated with rubber adhesive, which are obtainable commercially under the designations TESA® 4154 and TESA® 7476.

To measure the abhesiveness, these adhesive tapes were rolled onto the substrate were then stored at 40° C. under a load of 70 g/cm². After 24 hours, the force required to remove the respective adhesive tape from the substrate with a speed of 30 cm/min at a peel angle of 180° was measured. This force is termed the release force. The general test procedure corresponds essentially to FINAT Test Method No. 10. To examine the aging behavior, the storage period is extended to 7 and 14 days under the conditions described above.

Loop Test

The purpose of the loop test is to determine rapidly the degree of curing of a release coating. For this purpose a strip about 20 cm long of the adhesive tape TESA® 4154 from Beiersdorf was rolled three times onto the substrate and peeled off again immediately by hand. Then a loop was formed by placing together the ends of the adhesive tape, so that the adhesive areas of the two ends are in contact over an extent of about one centimeter. The ends were then parted again by hand, during which the contact area should move evenly to the center of the adhesive tape. In the case of contamination with poorly cured release material, the bond strength of the adhesive tape was no longer sufficient to maintain the contact area when the ends were pulled apart. In this case, the test was said not to have been passed.

Residual Bond Strength

The determination of the residual bond strength took place very largely in accordance with the FINAT Test Method No. 11. For this purpose the adhesive tape TEST® 7475 from Beiersdorf was rolled onto the substrate and then stored at 40° C. under a load of 70 g/m². After 24 hours the adhesive tape was separated from the release substrate and is rolled onto a defined substrate (steel plate, glass plate, foil). After one minute the force required to peel the adhesive tape from the substrate with a speed of 30 cm/min at a peel angle of 180° was measured. The value measured in this way is divided by the value given by an untreated adhesive tape under otherwise identical test conditions. The result is termed the residual bond strength and is generally indicated in percent.

| Example | Loop test | Residual bond strength % | Release force TESA ® 7475 N/2.5 cm | Release force TESA ® 7476 N/2.5 cm | Release force TESA ® 4154 N/2.5 cm |
|---|---|---|---|---|---|
| 1 b | satis. | 97 | 2.9 | 5.4 | 3.1 |
| 2 | satis. | 95 | 2.5 | 5.2 | 2.8 |
| 3 | satis. | 91 | 0.1 | 0.4 | 0.1 |
| 4 | not satis. | 52 | n.d. | n.d. | n.d. |
| 5 | satis. | 92 | 2.0 | 4.9 | 2.9 | satis. = satisfactory
n.d. = not determinable

The above description of invention is intended to be illustrative and not limiting, various changes or modifications in the embodiments described may occur to those skilled in the art. These can be made without departing from the scope and spirit of the invention.

What is claimed is:

1. An organopolysiloxane that contains (meth)acrylate groups and does not contain more than 10% Si—O—C-linked byproducts which is obtained by an addition reaction that comprises first reacting an organopolysiloxane of the formula

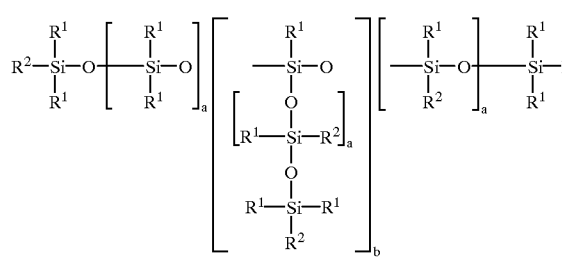

(I)

where
R¹=identical or different, aliphatic or aromatic hydrocarbon radicals
R²=R¹ or H, with the proviso that at least one radical R² is H,
a=from 0 to 500,
b=from 0 to 5,
with a polyhydroxy alkenyl ether of the formula

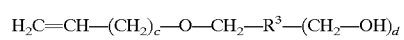

(II)

where
R³=a linear, cyclic, aromatic or branched hydrocarbon radical, with or without ether bridges,
c=from 0 to 10,
d=from 2 to 10,
in the presence of platinum or rhodium catalysts, wherein the metal has an oxidation state of I, II, or III, and second, reacting the product formed above with, from about 0.4- to about 1-molar amounts of (meth)acrylic acid and from 0- to about 0.6-molar amounts of a monocarboxylic acid, based on hydroxyl groups, where said monocarboxylic acid is free from double bonds which are capable of undergoing addition polymerization.

2. The organopolysiloxane as claimed in claim 1, wherein
R¹=identical or different, aliphatic or aromatic hydrocarbon radicals
R²=R¹ or H, with the proviso that at least one radical R² is H,
a=from 0 to 500,
b=from 0 to 5,
with a polyhydroxy alkenyl ether of the general formula II

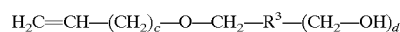

(II)

R³=a linear, cyclic, aromatic or branched hydrocarbon radical (with or without ether bridges) of 1 to 20 carbon atoms,
c=from 0 to 10,
d=from 2 to 10,
in the presence of platinum or rhodium catalysts and subsequent reaction with from 0.4- to 1-molar amounts of (meth)acrylic acid and from 0- to 0.6-molar amounts of a monocarboxylic acid of 2 to 10 carbon atoms, based on hydroxyl groups, where said monocarboxylic acid is free from double bonds which are capable of undergoing addition polymerization.

3. The organopolysiloxane as claimed in claim 1, wherein
R¹=a lower alkyl radical of 1 to 10 carbon atoms or a phenyl radical
R³=an alkyl radical of 1 to 10 carbon atoms.

4. An organopolysiloxane as claimed in claim 1, wherein R¹ is methyl.

5. An organopolysiloxane as claimed in claim 1, wherein a is from 0 to 200.

6. An organopolysiloxane as claimed in claim 1, wherein b is from 0 to 3.

7. An organopolysiloxane as claimed in claim 1, wherein c is from 0 to 5.

8. An organopolysiloxane as claimed in claim 1, wherein d is from 2 to 5.

9. An organopolysiloxane as claimed in claim 1, wherein the molar ratio of (meth)acrylic acid to the monocarboxylic acid which is free from double bonds that are capable of undergoing addition polymerization is from about 0.5:0.5 to about 0.9:0.1, based on hydroxyl groups.

10. An organopolysiloxane as claimed in claim 1, wherein the polyhydroxy alkenyl ether is of the formula

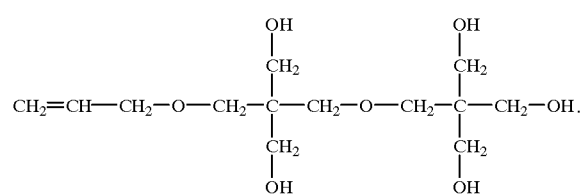

11. An organopolysiloxane as claimed in claim 1, wherein the polyhydroxy alkenyl ether is of the formula

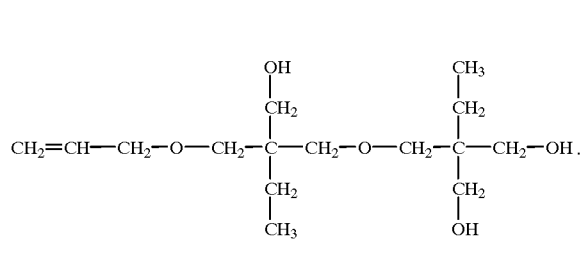

12. An organopolysiloxane as claimed in claim 1, wherein the polyhydroxy alkenyl ether is

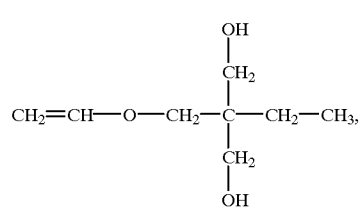

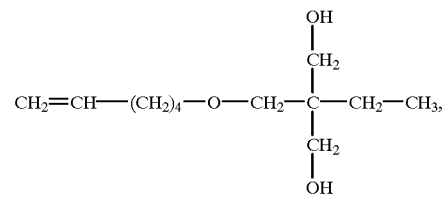

-continued
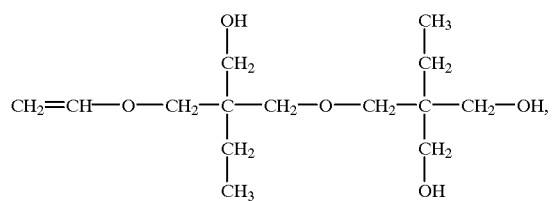
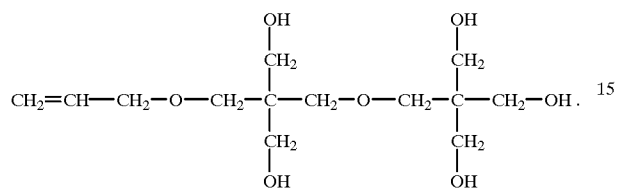
13. An organopolysiloxane as claimed in claim 1, wherein the polyhydroxy alkenyl ether of the formula
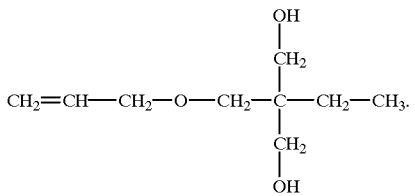
14. An organopolysiloxane as claimed in claim 1, wherein the polyhydroxy alkenyl ether of the formula
15. The organopolysiloxane as claimed in claim 1, which are
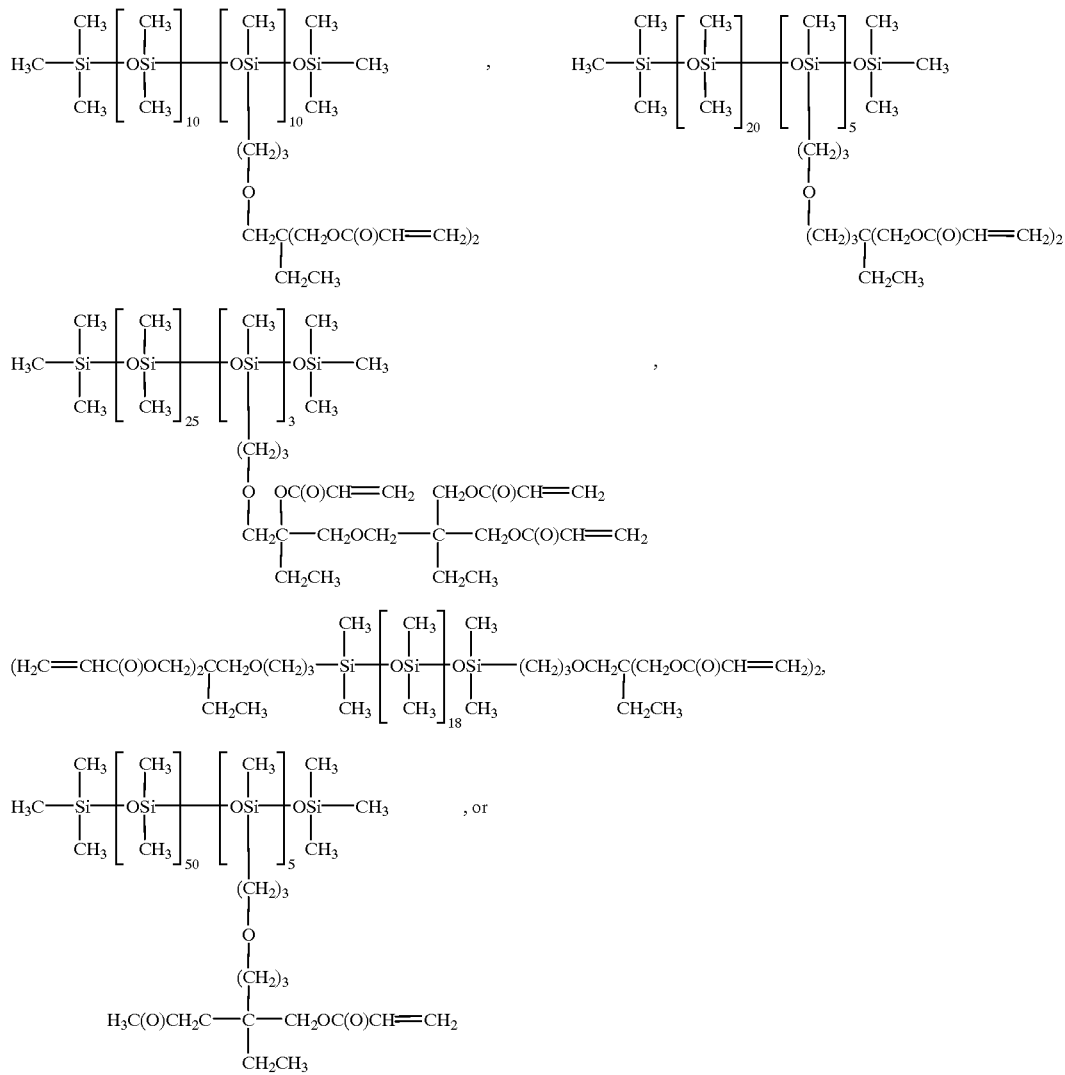

-continued

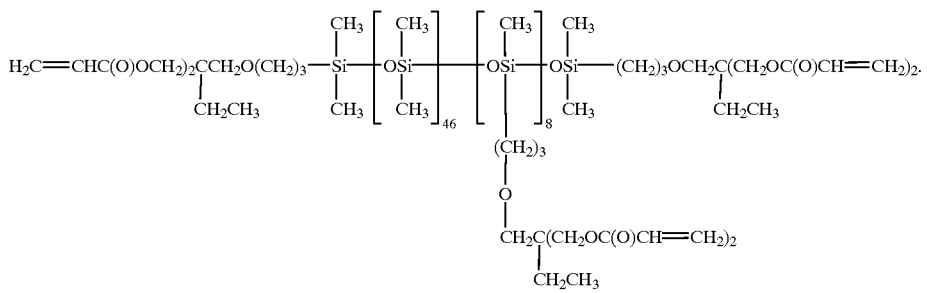

16. The organopolysiloxane as claimed in claim 1, which is

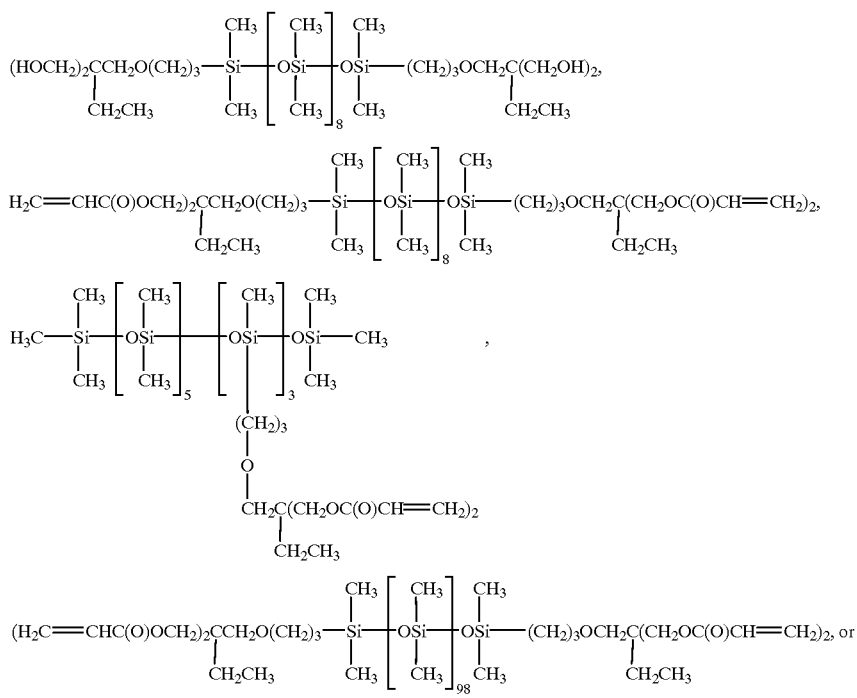

17. A curable binder or a curable adhesive coating material, which comprises an organic polysiloxane according to claim 1 and optimally curing initiators, fillers, pigments, organopolysiloxane (meth)acrylates or acrylate systems additives.

18. A process for preparing an organopolysiloxane that contains (meth)acrylate groups which comprises reacting an organopolysiloxane of the formula

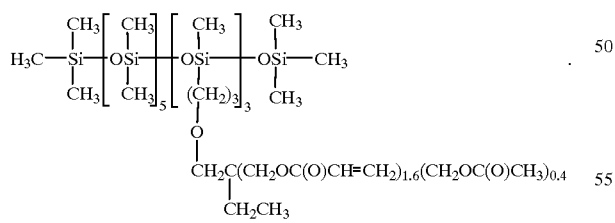

(I)

where
$R^1$=identical or different, aliphatic or aromatic hydrocarbon radicals
$R^2$=$R^1$ or H, with the proviso that at least one radical $R^2$ is H,
a=from 0 to 500,
b=from 0 to 5, with a polyhydroxy alkenyl ether of the formula

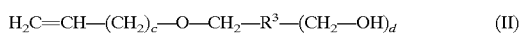

where
R³=a linear, cyclic, aromatic or branched hydrocarbon radical, with or without ether bridges,
c=from 0 to 10,
d=from 2 to 10, in the presence of platinum or rhodium catalysts, wherein the metal has an oxidation state of I, II, or III, and second, reacting the product formed above with, from about 0.4- to about 1-molar amounts of (meth)acrylic acid and from 0- to about 0.6-molar amounts of a monocarboxylic acid, based on hydroxyl groups, where said monocarboxylic acid is free from double bonds which are capable of undergoing addition polymerization.

19. The process as claimed in claim 18, a catalyst selected from the group consisting of tris(ethylenediamine)rhodium (III), bis(triphenyl-phosphine)rhodium carbonyl chloride; 2,4-[Rh(C₅H₇O₂)(CO)(PPh₃)]; 2,4-pentanedionatodicarbonylrhodium(I); tris(2,4-pentanedionato)rhodium(III); acetylacetonatobis(ethylene)rhodium(I); di-μ-chlorodichlorobis(cyclohexene)diplatinum (II); di-μ-chlorodichlorobis(ethylene)diplatinum(II); 1,1-cyclobutanedicarboxylatodiamineplatinum(II); dibromo(1,5-cyclooctadiene)platinum(II); cis-di-chlorobis(pyridine)-platinum(II); dichlorobis(1,5-cyclooctadiene)-platinum(II); and dichloro(dicyclopentadienyl)platinum(II).

20. The process as claimed in claim 18, wherein the molar ratio of meth(acrylic) acid to the monocarboxylic acid which is free from double bonds and are capable of undergoing addition polymerization is from about 0.5:0.5 to about 0.9:0.1, based on hydroxyl groups.

21. A polyhydroxyl organosiloxane of the formula

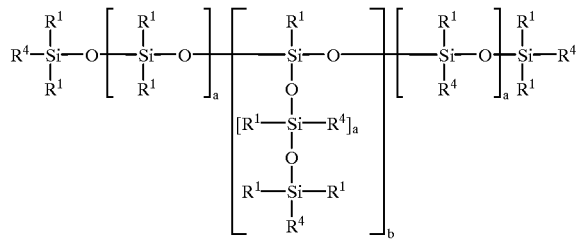

where
R¹=identical or different, aliphatic or aromatic hydrocarbon radicals
a=0 to 500,
b=0 to 5,
R⁴=R¹ or the radical (CH₂)₂—(CH₂)_c—O—CH₂—R³(CH₂—OH)_d
where
R³=a linear, cyclic, aromatic or branched hydrocarbon radical, with or without ether bridges,
c=0 to 10,
d=2 to 10.

22. The organopolysiloxane according to claim 21, wherein R¹ is identical or different aliphatic or aromatic hydrocarbon radical of 1 to 10 carbon atoms and R³ is a linear, cyclic, aromatic or branched hydrocarbon radical of 1 to 20 carbon atoms, with or without ether bridges.

23. The organopolysiloxane according to claim 21, wherein R¹ is an alkyl radical of 1 to 10 carbon atoms or phenyl and R³ is an alkyl radical of 1 to 10 carbon atoms.

24. The organopolysiloxane according to claim 21, which is

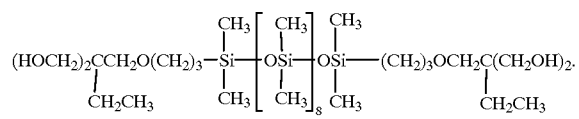

25. A process for preparing a polyhydroxyl organosiloxane according to claim 21, which comprises groups which comprises reacting an organopolysiloxane of the formula

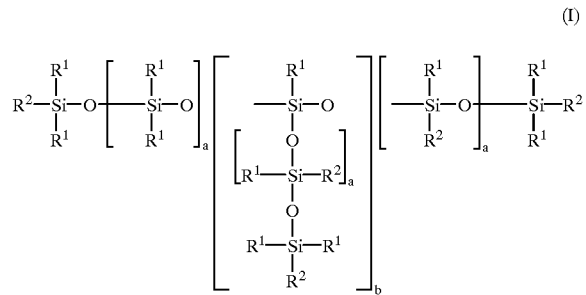

where
R¹=identical or different, aliphatic or aromatic hydrocarbon radicals
R²=R¹ or H, with the proviso that at least one radical R² is H,
a=from 0 to 500,
b=from 0 to 5, with a polyhydroxy alkenyl ether of the formula

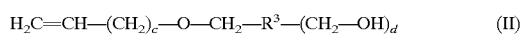

where
R³=a linear, cyclic, aromatic or branched hydrocarbon radical, with or without ether bridges,
c=from 0 to 10,
d=from 2 to 10, in the presence of platinum or rhodium catalysts, wherein the metal has an oxidation state of I, II, or III.

26. The process as claimed in claim 25, wherein the catalyst selected from the group consisting of tris (ethylenediamine)rhodium(III), bis(triphenyl-phosphine)rhodium carbonyl chloride; 2,4-[Rh(C₅H₇O₂)(CO)(PPh₃)]; 2,4-pentanedionatodicarbonyl-rhodium(I); tris(2,4-pentanedionato)rhodium(III); acetylacetonatobis(ethylene)rhodium(I); di-μ-chlorodichlorobis(cyclohexene)diplatinum (II); di-μ-chlorodichlorobis(ethylene)diplatinum(II); 1,1-cyclobutanedicarboxylatodiamineplatinum(II); dibromo(1,5-cyclooctadiene)platinum(II); cis-di-chlorobis(pyridine)-platinum(II); dichlorobis(1,5-cyclooctadiene)-platinum(II); and dichloro(dicyclo-pentadienyl)platinum(II).

27. An polyhydroxyl organosiloxane obtained by a process which comprises reacting an organopolysiloxane of the formula

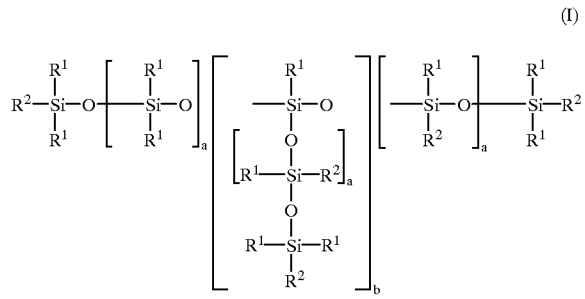

(I)

where

R¹=identical or different, aliphatic or aromatic hydrocarbon radicals

R²=R¹ or H, with the proviso that at least one radical R² is H, a=from 0 to 500, b=from 0 to 5, with a polyhydroxy alkenyl ether of the formula

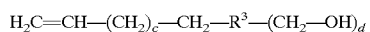

(II)

where

R³=a linear, cyclic, aromatic or branched hydrocarbon radical, with or without ether bridges, c=from 0 to 10, d=from 2 to 10, in the presence of platinum or rhodium catalysts, wherein the metal has an oxidation state of I, II, or III.

28. The polyhydroxyl organosiloxane as claimed in claim 27, obtained by the process wherein the catalyst selected from the group consisting of tris(ethylenediamine)rhodium (III), bis(triphenyl-phosphine)rhodium carbonyl chloride; 2,4-[Rh(C₅H₇O₂)(CO)(PPh₃)]; 2,4-pentanedionatodicarbonyl-rhodium(I); tris(2,4-pentanedionato)rhodium(II); acetylacetonatobis(ethylene)rhodium(I); di-μ-chlorodichlorobis(cyclohexene)diplatinum (II); di-μ-chlorodichlorobis(ethylene)diplatinum(II); 1,1-cyclobutanedicarboxylatodiamineplatinum(II); dibromo(1,5-cyclooctadiene)platinum(II); cis-di-chlorobis(pyridine)-platinum(II); dichlorobis(1,5-cyclooctadiene)-platinum(II); and dichloro(dicyclo-pentadienyl)platinum(II).

29. The organopolysiloxane according to claim 27, which is obtained from the reaction, wherein the polyhydroxy alkenyl ether is of the formula

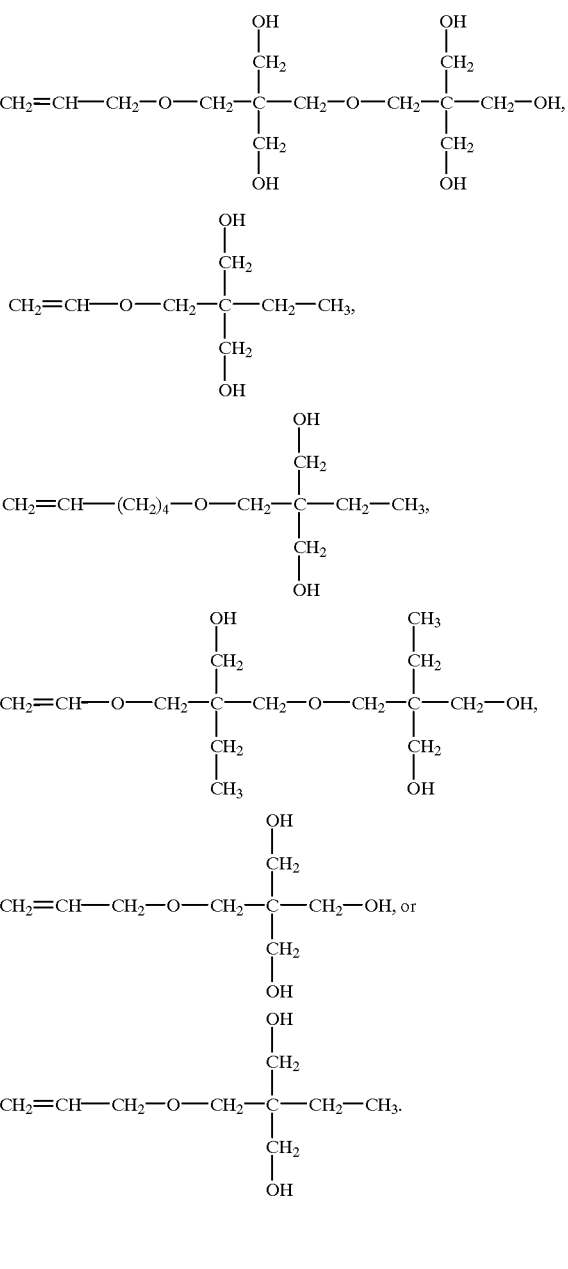

* * * * *